(12) United States Patent
Isom et al.

(10) Patent No.: US 8,868,284 B2
(45) Date of Patent: Oct. 21, 2014

(54) VIRTUAL MONITORING OF AIRCRAFT FLEET LOADS

(75) Inventors: Joshua D. Isom, South Windsor, CT (US); James P Cycon, Media, PA (US); Erez Eller, Oakville, CT (US); Mark W. Davis, Southbury, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 960 days.

(21) Appl. No.: 12/939,596

(22) Filed: Nov. 4, 2010

(65) Prior Publication Data

US 2011/0112878 A1 May 12, 2011

Related U.S. Application Data

(60) Provisional application No. 61/260,565, filed on Nov. 12, 2009.

(51) Int. Cl.
*G06Q 10/00* (2012.01)
*G07C 5/00* (2006.01)
*G06Q 10/06* (2012.01)
*G07C 5/08* (2006.01)

(52) U.S. Cl.
CPC ............... *G07C 5/006* (2013.01); *G07C 5/008* (2013.01); *G06Q 10/06311* (2013.01); *G07C 5/0841* (2013.01)
USPC ...................................................... 701/31.4

(58) Field of Classification Search
None
See application file for complete search history.

(56) References Cited

U.S. PATENT DOCUMENTS

| | | | | |
|---|---|---|---|---|
| 5,596,658 | A * | 1/1997 | Levy et al. | 382/243 |
| 2006/0004499 | A1* | 1/2006 | Trego et al. | 701/29 |
| 2006/0259217 | A1* | 11/2006 | Gorinevsky et al. | 701/29 |
| 2007/0078528 | A1 | 4/2007 | Anke et al. | |
| 2007/0168157 | A1* | 7/2007 | Khibnik et al. | 702/182 |
| 2009/0083050 | A1* | 3/2009 | Eltman et al. | 705/1 |
| 2009/0322557 | A1* | 12/2009 | Robb et al. | 340/870.3 |
| 2011/0245999 | A1* | 10/2011 | Kordonowy | 701/3 |

OTHER PUBLICATIONS

Fan Lili, "Structural Health Monitoring based on Principal Components Analysis implemented on a Distributed and Open System", May 2006, City University of Hong Kong.*
Kourosh Danai, "Method for Knowledge-Based Helicopter Track and Balance", May 10, 2004, Dept of Mechanical and Industrial Engineering, University of Massachusetts.*
European Patent Office Search Report: EP Application No. 10251921.2; EP filing date: Nov. 12, 2010; Date of Mailing: Mar. 29, 2011; 6 pages.

* cited by examiner

*Primary Examiner* — Khoi Tran
*Assistant Examiner* — Ryan Rink
(74) *Attorney, Agent, or Firm* — Cantor Colburn LLP

(57) ABSTRACT

A computer-implemented method, system, and computer program product for virtual monitoring of aircraft fleet loads are provided. The method includes calculating virtual load data associated with an aircraft from a set of orthogonal waveforms. The method also includes calculating a set of coefficients as a function of parametric data and high frequency data associated with an aircraft. The method further includes storing the set of coefficients on the aircraft and transmitting the set of coefficients to a ground-based system configured to reproduce the virtual load data based on a copy of the set of orthogonal waveforms and the received set of coefficients in order to perform aircraft fleet management.

14 Claims, 4 Drawing Sheets

VIRTUAL MONITORING OF AIRCRAFT FLEET LOADS

CROSS REFERENCE TO RELATED APPLICATIONS

This application is a non-provisional patent application which claims the benefit of U.S. provisional patent application 61/260,565 filed Nov. 12, 2009, the entire contents of which are incorporated herein by reference.

BACKGROUND OF THE INVENTION

The subject matter disclosed herein relates generally to aircraft diagnostics and prognostics. More particularly, the subject matter disclosed herein relates to virtual monitoring of aircraft fleet loads.

Aircraft have a large number of structural components that are subject to intense structural usage. These components are often expensive to replace. Conventional structural health management policies replace components after a fixed number of flight hours on a given aircraft, regardless of the actual structural usage of the components on the given aircraft. Since the structural components may have a measurable and predictable life cycle, prediction of component deterioration so as to anticipate a potential failure facilitates prolonged operations. Early detection of potential failures or fractures within a structural component provides the ability to perform preventative maintenance and avoid potential component failure.

Manual inspection is one method of monitoring the health of structural components. Some aircrafts incorporate Health and Usage Monitoring Systems ("HUMS") to monitor the health of critical components and collect operational flight data utilizing on-board sensors and avionic systems. HUMS can create large volumes of data, which may vary in frequency and duration depending on the components monitored.

BRIEF DESCRIPTION OF THE INVENTION

According to one aspect of the invention, a computer-implemented method for virtual monitoring of aircraft fleet loads is provided. The method includes calculating virtual load data associated with an aircraft from a set of orthogonal waveforms. The virtual load data provides estimated structural loads on components of the aircraft while in operation. The method also includes calculating a set of coefficients as a function of parametric data and high frequency data associated with the aircraft. The set of coefficients includes fewer data values than the virtual load data. Selectively combining the set of coefficients and the set of orthogonal waveforms produces the virtual load data. The method also includes storing the set of coefficients on the aircraft and transmitting the set of coefficients from the aircraft to a ground-based system configured to perform aircraft fleet management. The ground-based system includes a maintenance database with a copy of the set of orthogonal waveforms in order to reproduce the virtual load data in combination with the received set of coefficients.

According to another aspect of the invention, a system for virtual monitoring of aircraft fleet loads is provided. The system includes a health and usage monitoring system (HUMS) configured to receive a combination of parametric data and high frequency data associated with an aircraft. The HUMS includes a data storage device configured to store a set of coefficients and a set of orthogonal waveforms as basis waveforms to calculate virtual load data associated with the aircraft. The HUMS also includes a processing circuit configured to execute monitoring logic. The monitoring logic determines the set of coefficients as a function of the parametric data and high frequency data. Selectively combining the set of coefficients and the set of orthogonal waveforms produces the virtual load data. The system also includes a communication interface configured to transmit the set of coefficients from the HUMS to a ground-based system configured to perform aircraft fleet management. The ground-based system includes a maintenance database with a copy of the set of orthogonal waveforms in order to reproduce the virtual load data in combination with a received set of coefficients.

According to a further aspect of the invention, a computer program product for virtual monitoring of aircraft fleet loads is provided. The computer program product includes a storage medium readable by a processing circuit and storing instructions for execution by the processing circuit for implementing a method. The method includes receiving a set of coefficients from an aircraft to define virtual load data as a function of parametric data and high frequency data associated with the aircraft. The method also includes reading a set of orthogonal waveforms as basis waveforms to calculate the virtual load data associated with the aircraft. The method further includes reproducing the virtual load data by selectively combining the set of coefficients and the set of orthogonal waveforms, where the set of coefficients includes fewer data values than the reproduced virtual load data. The method additionally includes determining damage metrics from the reproduced virtual load data, and storing the damage metrics and the set of coefficients in a maintenance database.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
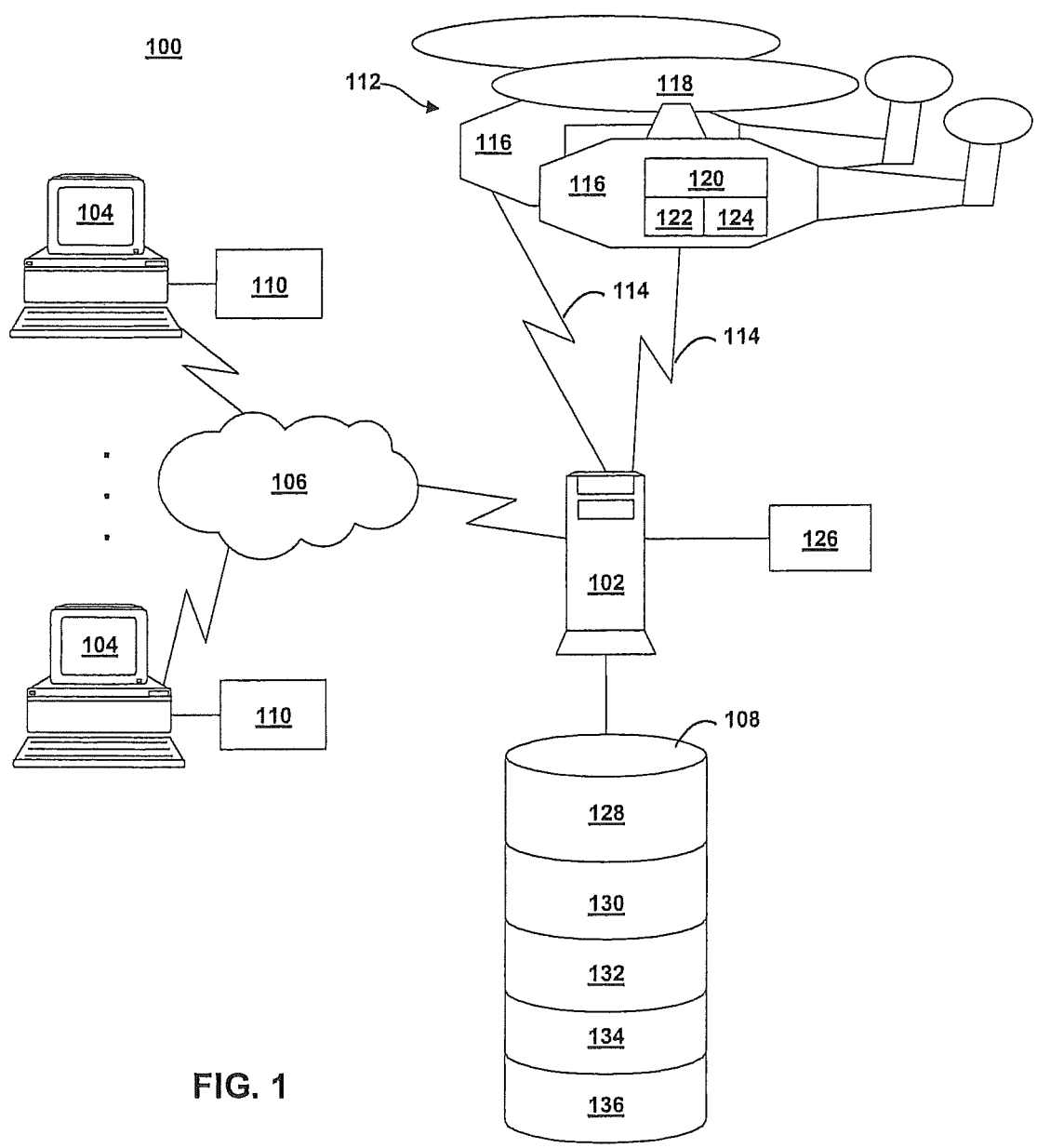
FIG. 1 is an example of a system for virtual monitoring of aircraft fleet loads.

The detailed description explains embodiments of the invention, together with advantages and features, by way of example with reference to the drawings.

DETAILED DESCRIPTION OF THE INVENTION

Exemplary embodiments provide virtual monitoring of aircraft fleet loads. Structural loads experienced by components throughout an aircraft can be monitored to calculate structural usage metrics for these components. Once structural usage metrics are calculated, policies for usage-based maintenance can be implemented. These policies may substantially reduce aircraft maintenance costs while improving aircraft safety and reliability. The structural loads experienced by aircraft components may also be monitored for fault detection and isolation. One example of the use of estimated structural loads for fault detection and isolation is described in U.S. patent application Ser. No. 12/337,848 entitled METHOD AND APPARATUS FOR MONITORING STRUCTURAL HEALTH, filed on Dec. 18, 2008 and of common assignment herewith. U.S. patent application Ser. No. 12/337,848 is incorporated by reference herein in its entirety. Monitoring of structural loads experienced by aircraft components can also be used to implement flight control laws that limit the loads experienced by the components, thus extending the life of the components.

As used in this specification, the term "load" encompasses the loads themselves (e.g., mechanical loads, electromechanical loads, electromagnetic loads, etc.) as well as responses (e.g., electromechanical responses, electromagnetic responses, optical responses, etc.) to a load; thus, load signals may indicate, for example, force, moment, torque, stress, strain, current, and/or voltage.

In practice, it is impractical to equip an aircraft deployed for field use with load sensors on all structural elements, as there is substantial material and labor cost associated with the installation of load sensors. The addition of sensors and wiring to convey sensor signals adds substantial weight to the aircraft. Furthermore, the durability of conventional sensors for load measurement may be limited. Thus, virtual load monitoring can be performed to estimate dynamic signals according to a model. To estimate loads, signal information for a given component is calculated by inputting measured state parameters and measured loads into a signal estimation model.

Virtual monitoring of aircraft structural loads may be performed in real-time onboard an aircraft. The real-time virtual monitoring can leverage real-time estimates of structural loads to produce virtual load data. Load estimation may be triggered based on certain events, such as commencement of a flight maneuver anticipated to produce high structural loads. Accurate estimation of structural loads may be enhanced by the use of high-frequency information, such as signals from on-board accelerometers.

In exemplary embodiments, virtual monitoring of loads generates estimates of high-frequency load waveforms as virtual load data. The quantity of data associated with high-frequency load estimates for a large number of structural components may be so large that it is impractical to transmit and store all of the data. Providing load estimates generated by virtual monitoring to aircraft operators and original equipment manufacturers (OEMs) enables implementation of usage-based maintenance policies across aircraft fleets. In order to conserve onboard storage space, communication bandwidth and ground-based storage, a set of coefficients used to generate the virtual load data is retained in the aircraft and transmitted to a ground-based system. The set of coefficients includes fewer data values than the virtual load data. Thus, storing and transmitting the set of coefficients enables the virtual load data to be calculated and analyzed locally in an onboard system, as well as reproduced at a ground-based system without requiring storage and transmission of the virtual load data itself.

FIG. 1 is an example of a system 100 for virtual monitoring of aircraft fleet loads. The system 100 includes a ground-based system 102 in communication with remote systems 104 over a network 106. The ground-based system 102 can access a maintenance database 108 on a data storage device to read and write data in response to requests from the remote systems 104. In exemplary embodiments, the ground-based system 102 is a high-speed processing device (e.g., a mainframe computer, a desktop computer, a laptop computer, or the like) including at least one processing circuit (e.g., a CPU) capable of reading and executing instructions, and handling numerous interaction requests from the remote systems 104. The ground-based system 102 may also represent a cluster of computer systems collectively performing processes as described in greater detail herein.

In exemplary embodiments, the remote systems 104 comprise desktop, laptop, general-purpose computer devices, and/or networked devices with processing circuits and I/O interfaces, such as a keyboard and display device. The ground-based system 102 and remote systems 104 can include various computer hardware and software technology known in the art, such as one or more processing units or circuits, volatile and non-volatile memory including removable media, power supplies, network interfaces, support circuitry, operating systems, user interfaces, and the like. Remote users can initiate various tasks locally on the remote systems 104, such as requesting data from the ground-based system 102 via secure clients 110. The secure clients 110 can access web pages or components and execute hypertext transfer protocol (HTTP)-enabled content sourced from the ground-based system 102. The HTTP-enabled content may include secure HTTP, such as HTTP over a secure socket layer (HTTPS). The secure clients 110 may support other communication or transfer protocols known in the art.

The network 106 may be any type of communications network known in the art. For example, the network 106 may be an intranet, extranet, or an internetwork, such as the Internet, or a combination thereof. The network 106 can include wireless, wired, and/or fiber optic links. Additional computer systems (not depicted) can also be accessed via the network 106 or other networks.

The data storage device upon which the maintenance database 108 is stored refers to any type of computer readable storage medium and may comprise a secondary storage element, e.g., hard disk drive (HDD), tape, or a storage subsystem that is internal or external to the ground-based system 102. Types of data that may be stored in the data storage device include, for example, various files and databases.

The ground-based system 102 is also configured to communicate with an aircraft fleet 112 via communication links 114. The aircraft fleet 112 can include a variety of aircraft 116, such as fixed-wing and rotorcrafts. In the example depicted in FIG. 1, each aircraft 116 is a rotorcraft with a main rotor 118 capable of revolving at a sufficient velocity to sustain flight. Aircraft 116 also includes a health and usage monitoring system (HUMS) 120 configured to receive a combination of low-frequency aircraft state parametric data and high frequency data from low-frequency sensors 122 and high-frequency sensors 124. In an exemplary embodiment, the low-frequency aircraft state parameters are sampled once per revolution of the main rotor 118, and the high-frequency data are sampled more than once per revolution of the main rotor 118.

The communication links 114 can be wireless communication links. The communication links 114 may also support wired and/or optical communication when aircraft 116 are on the ground and within physical proximity to the ground-based system 102. In exemplary embodiments, the aircraft fleet 112 transmits flight data to the ground-based system 102 for fleet management.

The ground-based system 102 includes fleet management logic 126 capable of reproducing the virtual load data as calculated on each aircraft 116. In exemplary embodiments, the maintenance database 108 holds a variety of data for the aircraft fleet 112. The maintenance database 108 can include sets of orthogonal waveforms 128 to calculate virtual load data associated with the aircraft fleet 112, sets of coefficients 130, damage metrics 132, aircraft fleet maintenance schedules 134, and aircraft fleet maintenance policies 136. The fleet management logic 126 reproduces virtual load data by multiplying a subset of the sets orthogonal waveforms 128 with corresponding coefficients from the sets of coefficients 130 to produce weighted waveforms, and sums the weighted waveforms. The fleet management logic 126 can calculate and store the damage metrics 132 from the reproduced virtual load data. The damage metrics 132 may include per-operation load ranges, per-main rotor revolution load amplitudes, and per-operation load peaks. The fleet management logic 126 can filter the damage metrics 132 to locate an operation of interest, for instance, in response to a request from the remote systems 104. Virtual load data can also be reconstructed from a subset of the sets of coefficients 130 associated with the filtered damage metrics to support fault-detection and isolation. Although the virtual load data can be stored in the maintenance database 108, it need not be made persistent, as the virtual load data can be reproduced on demand.

The maintenance database 108 can collect multiple sets of coefficients 130 for reproducing virtual load data from multiple missions of the aircraft 116 in addition to fleet-wide data collection and processing. By analyzing fleet-wide damage metrics and fleet virtual load data, the aircraft fleet maintenance schedules 134 can be adjusted according to the aircraft fleet maintenance policies 136. For example, the aircraft fleet maintenance policies 136 can implement usage-based maintenance policies for the aircraft fleet 112, adjusting a requested inspection or replacement interval for specific components as a function of estimated loads versus expected loads. If the damage metrics 132 indicate that a component is starting to fail as exhibited by out-of-band tolerance performance or virtual loads exceeding an expected operating range for a defined duration, then effected aircraft in the aircraft fleet 112 can be scheduled for maintenance actions by updating the aircraft fleet maintenance schedules 134. Alternatively, if the virtual load data reveals that components are experiencing far lesser loads than anticipated by the aircraft fleet maintenance policies 136, scheduled maintenance actions for effected aircraft in the aircraft fleet 112 may be delayed by updating the aircraft fleet maintenance schedules 134. It will be understood that the maintenance database 108 can also collect additional flight parameters and maintenance information in support of managing the aircraft fleet 112.

Figure 2:
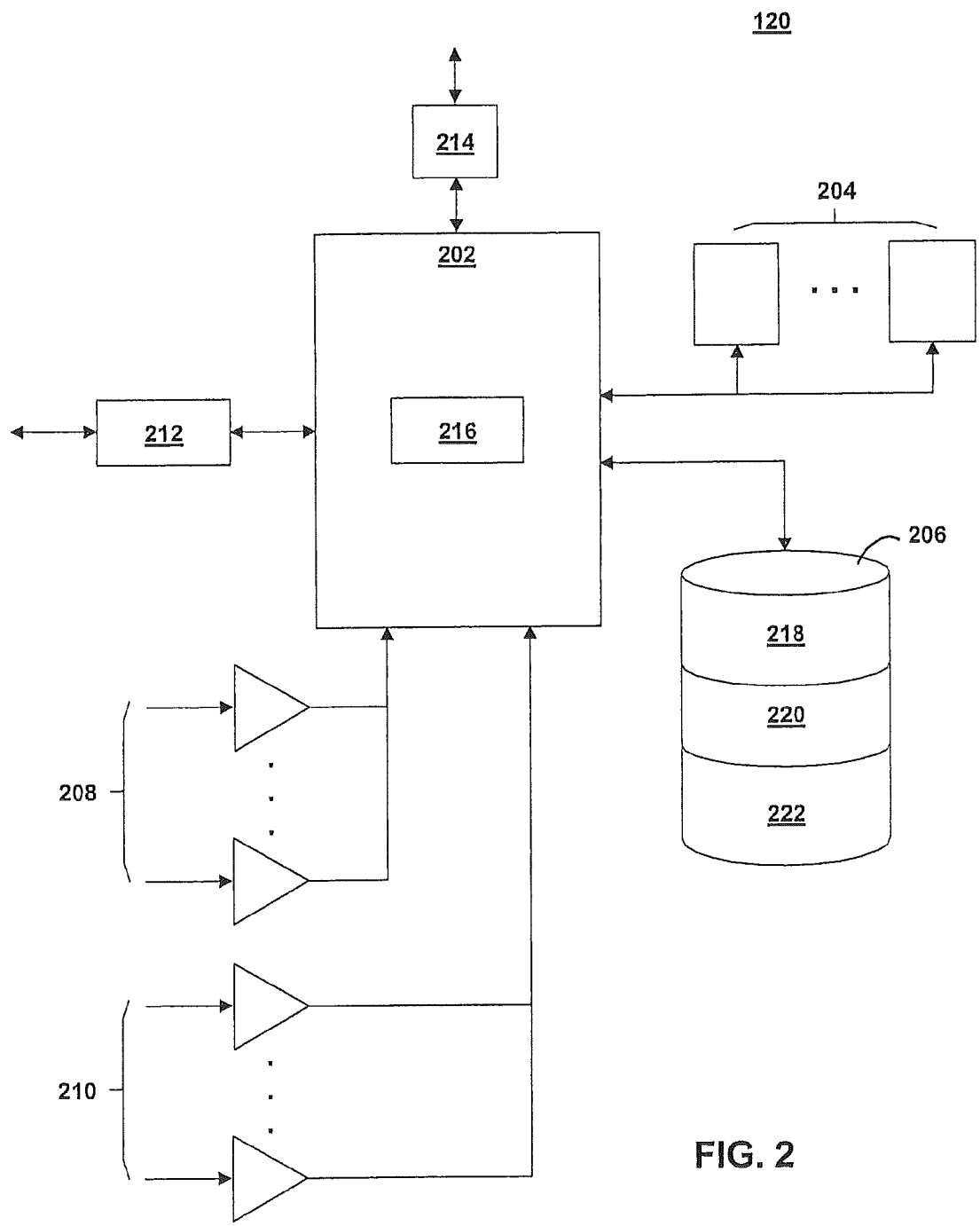
FIG. 2 is a block diagram of an on-board aircraft health and usage monitoring system in accordance with exemplary embodiments.

FIG. 2 depicts a block diagram of the HUMS 120 in accordance with exemplary embodiments. The HUMS 120 can include a processing circuit 202 that is interfaced to volatile memory 204, data storage device 206, low-frequency inputs 208, high-frequency inputs 210, communication interface 212, and intra-aircraft communication interface 214. The processing circuit 202 executes monitoring logic 216 that performs virtual load monitoring as further described herein. The processing circuit 202 may execute other health and usage logic (not depicted).

The volatile memory 204 can hold programs and/or data that do not persist upon power cycling. The data storage device 206 is a computer-readable storage medium that can include executable programs and data persisting when power is cycled, e.g., non-volatile memory. For example, the data storage device 206 can include a regression model 218 and a set of orthogonal waveforms 220. The data storage device 206 can include multiple components, such as flash memory, EEPROM, NOVRAM, and/or other storage technologies known in the art. The low-frequency inputs 208 may include signal-conditioning circuitry to acquire analog and/or digital inputs from the low-frequency sensors 124 of FIG. 1. The high-frequency inputs 210 can include signal-conditioning circuitry to acquire analog and/or digital inputs from the high-frequency sensors 122 of FIG. 1. The communication interface 212 supports external communication with the communication links 114 of FIG. 1, and may be integrated with or separate from the HUMS 120. The intra-aircraft communication interface 214 enables communication with other electronics on-board the aircraft 116 of FIG. 1, such as controllers and avionics systems (not depicted).

In exemplary embodiments, the set of orthogonal waveforms 220 is defined as a time-invariant set of waveforms for estimating loads on specific components. The set of orthogonal waveforms 220 is a subset of the sets of orthogonal waveforms 128 of FIG. 1. Empirical models for virtual monitoring of loads can be constructed using flight test data collected from a heavily instrumented test aircraft. In these tests, the loads of interest are measured using strain gauges and other instrumentation. In addition, other aircraft state measurements are also taken, including both low frequency information and high frequency information. After preprocessing the data, the principal components of a load waveform of interest are computed by taking a singular value decomposition of the set of load estimates recorded over one main rotor revolution when the aircraft is a rotorcraft, such as aircraft 116 of FIG. 1. The singular value decomposition generates the set of orthogonal waveforms 220 as basis waveforms, which are ordered by the amount of variance in the data captured by the waveforms. In most cases, a signal can be accurately reconstructed by a relatively small set of orthogonal waveforms 220.

The regression model 218 defines a mathematical relationship (such as, for example, a linear or quadratic) between available aircraft information, including pilot inputs and attitude, and coefficients for the set of orthogonal waveforms 220. The regression model 218 may be calculated using least-squares. Load estimates may be computed at least once per revolution of the main rotor 118 of FIG. 1, because one revolution of the main rotor 118 is the basic unit of periodicity for structural loads in aircraft 116. The load estimates are computed using parametric data, such as pilot inputs, aircraft attitude, and other aircraft state parameters. The parametric data may be received via the low-frequency inputs 208 and/or the intra-aircraft communication interface 214 when computed by other systems on the aircraft 116. High-frequency data is acquired from the high-frequency inputs 210 and may include strain gauge and accelerometer information sampled more than once per main rotor revolution. The regression model 218 is applied in order to calculate the set of coefficients 222 for the set of orthogonal waveforms 220 using the aircraft state parameters and features of the high-frequency signals. The set of coefficients 222 is recalculated and adjusted based on changes to the low-frequency inputs 208 and the high-frequency inputs 210. In exemplary embodiments, the set of coefficients 222 is recalculated at least once per revolution of the main rotor 118 of FIG. 1. Frequency domain features of the high frequency signals are computed and used in the regression model 218 to relate input signals to the set of coefficients 222.

For rotor-system induced loads, dominant frequencies may be in the range of 4-48 Hz, which means that corresponding load estimates are produced at frequencies of 8-96 Hz due to Nyquist-Shannon sampling theorem. For engine-induced vibration, a dominant frequency is about 425 Hz, which means that corresponding load estimates are produced at a frequency of 850 Hz, since the Nyquist-Shannon sampling theorem requires sampling at a rate twice the frequency of interest. Even higher frequencies may be desired for over sampling. Furthermore, real-time load estimates can be calculated on dozens of different components within the aircraft 116 of FIG. 1. Due to the large volume of load estimates, only a portion of the load estimates may be retained in the HUMS 120 to support real-time health monitoring. The set of coefficients 222 provide information for waveform shaping but includes fewer data points than the calculated virtual load data.

Figure 3:
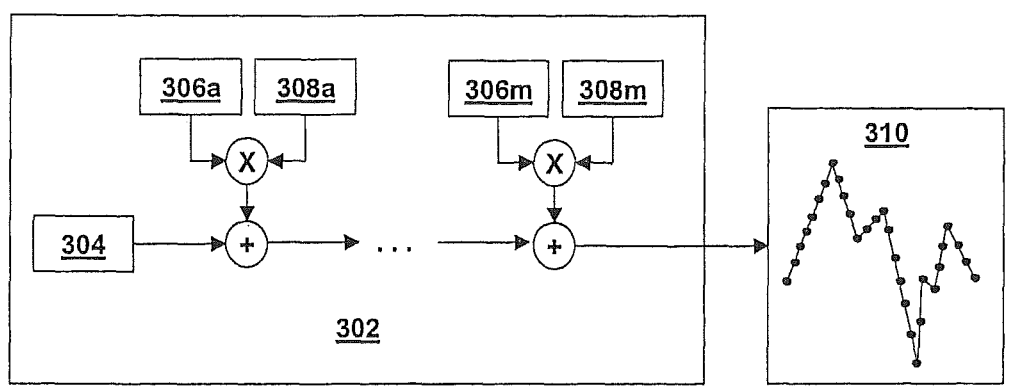
FIG. 3 is an example of virtual load data calculations in accordance with exemplary embodiments.
Figure 3:
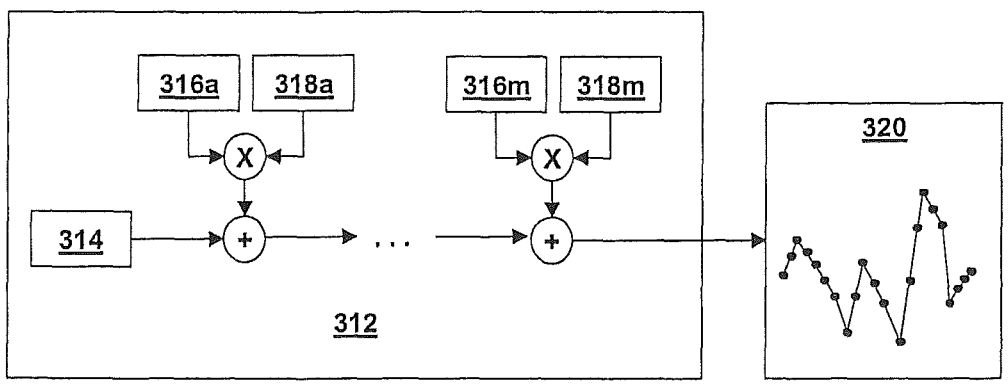

FIG. 3 depicts an example of virtual load data calculations 300 in accordance with exemplary embodiments. The virtual load data calculations 300 are performed by the monitoring logic 216 of FIG. 2 to create many sets of virtual load data. For example, virtual load calculation 302 sums a reference signal 304 with multiple products of orthogonal waveforms 306*a*-306*m* and coefficients 308*a*-308*m* to produce virtual load data 310. The orthogonal waveforms 306*a*-306*m* are basis waveforms from the set of orthogonal waveforms 220 of FIG. 2. The reference signal 304 may be an initial base coefficient from the set of coefficients 222 of FIG. 2. The coefficients 308*a*-308*m* are also from the set of coefficients 222, where the coefficients 308*a*-308*m* also have an association with the orthogonal waveforms 306*a*-306*m*. Each product of the orthogonal waveforms 306*a*-306*m* and coefficients 308*a*-308*m* is a weighted waveform, wherein the sum of the weighted waveforms and the reference signal 304 produces the virtual load data 310.

A similar process is repeated to generate additional virtual load data. For instance, virtual load calculation 312 sums a reference signal 314 with multiple products of orthogonal waveforms 316*a*-316*m* and coefficients 318*a*-318*m* to produce virtual load data 320. The orthogonal waveforms 316*a*-316*m* are basis waveforms from the set of orthogonal waveforms 220 of FIG. 2. The reference signal 314 may be an initial base coefficient from the set of coefficients 222 of FIG. 2. The coefficients 318*a*-318*m* are also from the set of coefficients 222, where the coefficients 318*a*-318*m* also have an association with the orthogonal waveforms 316*a*-316*m*. Each product of the orthogonal waveforms 316*a*-316*m* and coefficients 318*a*-318*m* is a weighted waveform, wherein the sum of the weighted waveforms and the reference signal 314 produces the virtual load data 320.

While each waveform in the virtual load data 310 and 320 is made up of many data values, fewer values of the coefficients 308*a*-308*m* and coefficients 318*a*-318*m* are used to produce the virtual load data 310 and 320. The information in the orthogonal waveforms 306*a*-306*m* and orthogonal waveforms 316*a*-316*m* is predefined and included in the sets of orthogonal waveforms 128 on the ground-support equipment 102 of FIG. 1. For example, whereas each set of virtual load data 310 and 320 produced for one second may have 850 numbers, the associated coefficients 308*a*-308*m* and 318*a*-318*m* may include as few as 5 to 10 numbers. Thus, storing and transmitting the set of coefficients 222 of FIG. 2 rather than the sets of virtual load data 310 and 320 can reduced the quantity of data stored and transmitted by a factor ranging from 85 to 170. This greatly reduces the burdens imposed on the HUMS 120, the ground-based system 102, and the communication links 114 of FIG. 1.

Figure 4:
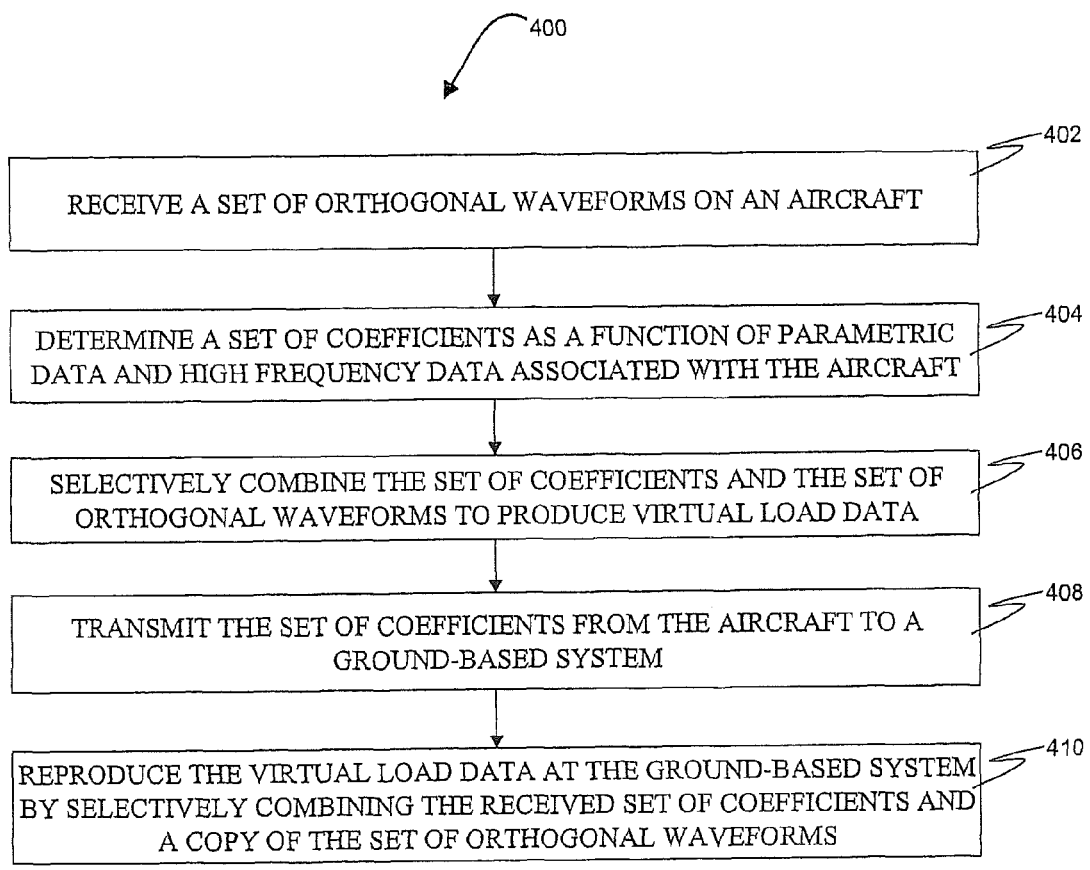
FIG. 4 depicts an exemplary process for virtual monitoring of aircraft fleet loads in accordance with exemplary embodiments.

FIG. 4 depicts an exemplary process 400 for virtual monitoring of aircraft fleet loads in accordance with exemplary embodiments. The process 400 is described in reference to FIGS. 1-3. The process 400 can be implemented in the fleet management logic 126 of FIG. 1 and monitoring logic 216 of FIG. 2. At block 402, the monitoring logic 216 receives the set of orthogonal waveforms 220. The fleet management logic 126 also has access to a copy of the same set of orthogonal waveforms 220, which may be stored in the sets of orthogonal waveforms 128.

At block 404, the monitoring logic 216 determines the set of coefficients 222 as a function of parametric data and high frequency data associated with the aircraft 116. As previously described, the parametric data and high frequency data can be received from a combination of the low-frequency inputs 208, the high-frequency inputs 210, and/or the intra-aircraft communication interface 214. The set of coefficients 222 can be calculated using the regression model 218 to map the parametric data and the high-frequency data to the set of coefficients 222.

At block 406, the monitoring logic 216 selectively combines the set of coefficients 222 and the set of orthogonal waveforms 220 to produce the virtual load data 310 and 320. As depicted in FIG. 3, selectively combining the set of coefficients 222 and the set of orthogonal waveforms 220 to produce virtual load data 310 and 320 may be performed by multiplying a subset of the set of orthogonal waveforms 220 with a corresponding subset of coefficients from the set of coefficients 222 to produce weighted waveforms which are summed. Orthogonal waveforms 306*a*-306*m* and coefficients 308*a*-308*m* are examples of corresponding subsets to produce virtual load data 310, while orthogonal waveforms 316*a*-316*m* and coefficients 318*a*-318*m* are examples of corresponding subsets to produce virtual load data 320. The reference signals 304 and 306 may be omitted or can be coefficients from the set of coefficients 222 normalized to an implied orthogonal waveform of unity.

At block 408, the monitoring logic 216 transmits the set of coefficients 222 from the aircraft 116 to ground-based system 102. At block 410, the fleet management logic 126 reproduces the virtual load data 310 and 320 by selectively combining the received set of coefficients 222 and a copy of the set of orthogonal waveforms 220. The received set of coefficients 222 can be stored as part of the fleet data for the aircraft fleet 112 in the sets of coefficients 130. As previously described, the reproduced virtual load data 310 and 320 can be used to create damage metrics 132, and adjust aircraft fleet maintenance schedules 134 according to aircraft fleet maintenance policies 136. By sending the set of coefficients 222 from the aircraft 116 to the ground-based system 102, equivalent data sets can be reproduced on the ground to track and manage performance across the aircraft fleet 112, while minimizing the bandwidth demands on the communication links 114 due to the reduced data set size.

Technical effects of exemplary embodiments include estimating aircraft structural loads in real-time onboard the aircraft, transmitting load estimate information to a ground-based system in a compact format, reconstructing high-frequency load estimates, and using these load estimates for usage-based maintenance and fault detection and isolation. The data received and reproduced at the ground-based system can be used to extend the life of aircraft structural components, reduce aircraft maintenance costs, and enhance safety. Logging or transmitting estimates of dozens of loads, at frequencies up to 850 Hz or more, imposes a great burden on data transmission and storage capability of onboard aircraft computers. Furthermore, embodiments of the invention can be used to avoid storing dozens of high frequency load estimates on a ground-based system, which would otherwise require a large amount of storage space and high-bandwidth communication channels.

The capabilities of the present invention can be implemented in software, firmware, hardware or some combination thereof.

As described above, embodiments can be embodied in the form of computer-implemented processes and apparatuses for practicing those processes. In exemplary embodiments, the invention is embodied in computer program code executed by one or more processing circuits. Embodiments include computer program code containing instructions embodied in tangible media, such as floppy diskettes, CD-ROMs, hard drives, universal serial bus (USB) flash drives, nonvolatile memory, or any other computer-readable storage medium, wherein, when the computer program code is loaded into and executed by a processing system including a processing circuit, the processing system becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a processing system, the processing system becomes an apparatus for practicing the invention. When implemented on a microprocessor, the computer program code segments configure the microprocessor to create specific logic circuits.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A computer-implemented method for virtual monitoring of aircraft fleet loads comprising:
periodically determining, by a health and usage monitoring system (HUMS) on an aircraft, a set of coefficients as a function of parametric data and high frequency data associated with the aircraft, wherein the aircraft is a rotorcraft with a main rotor, and the high-frequency data are sampled more than once per revolution of the main rotor, the parametric data comprises low-frequency aircraft state parameters sampled once per revolution of the main rotor;
calculating, by the HUMS, virtual load data associated with the aircraft from a set of orthogonal waveforms by selectively combining the set of coefficients and the set of orthogonal waveforms to produce the virtual load data by multiplying a subset of the set of orthogonal waveforms with a corresponding subset of coefficients from the set of coefficients to produce weighted waveforms, and summing the weighted waveforms, the virtual load data comprising estimated structural loads on components of the aircraft while in operation, wherein the set of coefficients comprises fewer data values than the virtual load data;
storing, by the HUMS, the set of coefficients on the aircraft; and
transmitting the set of coefficients from the aircraft to a ground-based system configured to reproduce the virtual load data based on a copy of the set of orthogonal waveforms and the received set of coefficients.

2. The method of claim 1 further comprising:
reproducing the virtual load data at the ground-based system by selectively combining the set of received coefficients and the copy of the set of orthogonal waveforms;
determining damage metrics from the reproduced virtual load data; and
storing the damage metrics and the received set of coefficients in a maintenance database.

3. The method of claim 2 further comprising:
collecting multiple sets of coefficients for reproducing fleet virtual load data from multiple missions of the aircraft and additional missions of additional aircraft in an aircraft fleet;
reproducing the fleet virtual load data from the multiple sets of coefficients;
calculating fleet damage metrics from the fleet virtual load data; and
adjusting aircraft fleet maintenance schedules in response to the fleet damage metrics.

4. The method of claim 2 wherein the damage metrics comprise: per-operation load ranges, per-main rotor revolution load amplitudes, and per-operation load peaks, and the method further comprises:
filtering the damage metrics to locate an operation of interest; and
reconstructing the virtual load data from a subset of the stored received set of coefficients associated with the filtered damage metrics.

5. The method of claim 1 wherein the set of orthogonal waveforms is an ordered set of load waveforms for one revolution of the main rotor, developed through singular value decomposition of data collected during development flight testing and ordered by an amount of variance.

6. A system for virtual monitoring of aircraft fleet loads, comprising:
a health and usage monitoring system (HUMS) configured to receive a combination of parametric data and high frequency data associated with an aircraft, wherein the aircraft is a rotorcraft with a main rotor, and the high-frequency data are sampled more than once per revolution of the main rotor, the parametric data comprises low-frequency aircraft state parameters sampled once per revolution of the main rotor, the HUMS comprising:
a data storage device configured to store a set of coefficients and a set of orthogonal waveforms as basis waveforms to calculate virtual load data associated with the aircraft, the virtual load data comprising estimated structural loads on components of the aircraft while in operation;
a processing circuit configured to execute monitoring logic, the monitoring logic determining the set of coefficients as a function of the parametric data and high frequency data, calculating the set of coefficients using a regression model to map the parametric data and the high-frequency data to the set of coefficients wherein the set of coefficients comprises fewer data values than the virtual load data, and selectively combining the set of coefficients and the set of orthogonal waveforms produces the virtual load data by multiplying a subset of the set of orthogonal waveforms with a corresponding subset of coefficients from the set of coefficients to produce weighted waveforms, and summing the weighted waveforms; and
a communication interface configured to transmit the set of coefficients from the HUMS to a ground-based system configured to perform aircraft fleet management, wherein the ground-based system comprises a maintenance database with a copy of the set of orthogonal waveforms to reproduce the virtual load data in combination with a received set of coefficients.

7. The system of claim 6 wherein the ground-based system is configured to perform:
reproducing the virtual load data in combination with the received set of coefficients;
determining damage metrics from the reproduced virtual load data; and
storing the damage metrics and the received set of coefficients in the maintenance database.

8. The system of claim 7 wherein the ground-based system is further configured to perform:
collecting multiple sets of coefficients for reproducing the virtual load data from multiple missions of the aircraft and additional missions of additional aircraft in an aircraft fleet;
reproducing fleet virtual load data from the multiple sets of coefficients;
calculating fleet damage metrics from the fleet virtual load data; and
adjusting aircraft fleet maintenance schedules in response to the fleet damage metrics.

9. A system for virtual monitoring of aircraft fleet loads, comprising:
a health and usage monitoring system (HUMS) configured to receive a combination of parametric data and high frequency data associated with an aircraft, wherein the aircraft is a rotorcraft with a main rotor, and the high-frequency data are sampled more than once per revolution of the main rotor, the parametric data comprises low-frequency aircraft state parameters sampled once per revolution of the main rotor, the HUMS comprising:
a data storage device configured to store a set of coefficients and a set of orthogonal waveforms as basis waveforms to calculate virtual load data associated with the aircraft, the virtual load data comprising estimated structural loads on components of the aircraft while in operation;
a processing circuit configured to execute monitoring logic, the monitoring logic determining the set of coefficients as a function of the parametric data and high frequency data, wherein the set of coefficients comprises fewer data values than the virtual load data, and selectively combining the set of coefficients and the set of orthogonal waveforms produces the virtual load data; and
a communication interface configured to transmit the set of coefficients from the HUMS to a ground-based system configured to perform aircraft fleet management, wherein the ground-based system comprises a maintenance database with a copy of the set of orthogonal waveforms to reproduce the virtual load data in combination with a received set of coefficients, the ground-based system is configured to perform:
reproducing the virtual load data in combination with the received set of coefficients;
determining damage metrics from the reproduced virtual load data, the damage metrics comprise: per-operation load ranges, per-main rotor revolution load amplitudes, and per-operation load peaks;
storing the damage metrics and the received set of coefficients in the maintenance database;
filtering the damage metrics to locate an operation of interest; and
reconstructing the virtual load data from a subset of the stored received set of coefficients associated with the filtered damage metrics.

10. A system for virtual monitoring of aircraft fleet loads, comprising:
a health and usage monitoring system (HUMS) configured to receive a combination of parametric data and high frequency data associated with an aircraft, wherein the aircraft is a rotorcraft with a main rotor, and the high-frequency data are sampled more than once per revolution of the main rotor, the parametric data comprises low-frequency aircraft state parameters sampled once per revolution of the main rotor, the HUMS comprising:
a data storage device configured to store a set of coefficients and a set of orthogonal waveforms as basis waveforms to calculate virtual load data associated with the aircraft, the virtual load data comprising estimated structural loads on components of the aircraft while in operation and the set of orthogonal waveforms is an ordered set of load waveforms for one revolution of the main rotor, developed through singular value decomposition of data collected during development flight testing and ordered by an amount of variance;
a processing circuit configured to execute monitoring logic, the monitoring logic determining the set of coefficients as a function of the parametric data and high frequency data, wherein the set of coefficients comprises fewer data values than the virtual load data, and selectively combining the set of coefficients and the set of orthogonal waveforms produces the virtual load data; and
a communication interface configured to transmit the set of coefficients from the HUMS to a ground-based system configured to perform aircraft fleet management, wherein the ground-based system comprises a maintenance database with a copy of the set of orthogonal waveforms to reproduce the virtual load data in combination with a received set of coefficients.

11. A computer program product for virtual monitoring of aircraft fleet loads, the computer program product comprising:
a non-transitory storage medium readable by a processing circuit and storing instructions for execution by the processing circuit for implementing a method, the method comprising:
receiving a set of coefficients from an aircraft to define virtual load data as a function of parametric data and high frequency data associated with the aircraft, wherein the aircraft is a rotorcraft with a main rotor, and the high-frequency data are sampled more than once per revolution of the main rotor, the parametric data comprises low-frequency aircraft state parameters sampled once per revolution of the main rotor;
reading a set of orthogonal waveforms as basis waveforms to calculate the virtual load data associated with the aircraft, the virtual load data comprising estimated structural loads on components of the aircraft while in operation;
reproducing the virtual load data by selectively combining the set of coefficients and the set of orthogonal waveforms by multiplying a subset of the set of orthogonal waveforms with a corresponding subset of coefficients from the set of coefficients to produce weighted waveforms, and summing the weighted waveforms, wherein the set of coefficients comprises fewer data values than the reproduced virtual load data;
determining damage metrics from the reproduced virtual load data; and storing the damage metrics and the set of coefficients in a maintenance database.

12. The computer program product of claim 11 wherein the method further comprises:
collecting multiple sets of coefficients for reproducing the virtual load data from multiple missions of the aircraft and additional missions of additional aircraft in an aircraft fleet;
reproducing fleet virtual load data from the multiple sets of coefficients;
calculating fleet damage metrics from the fleet virtual load data; and
adjusting aircraft fleet maintenance schedules in response to the fleet damage metrics.

13. The computer program product of claim 11 wherein the damage metrics comprise: per-operation load ranges, per-main rotor revolution load amplitudes, and per-operation load peaks, and the method further comprises:
filtering the damage metrics to locate an operation of interest; and
reconstructing the virtual load data from a subset of the stored received set of coefficients associated with the filtered damage metrics.

14. The computer program product of claim 11 wherein the set of orthogonal waveforms is an ordered set of load waveforms for one revolution of the main rotor, developed through singular value decomposition of data collected during development flight testing and ordered by an amount of variance.

* * * * *